United States Patent
Walfridsson (10) Patent No.: US 7,333,637 B2
(45) Date of Patent: Feb. 19, 2008

(54) BIOMETRIC IDENTITY CHECK

(75) Inventor: Krister Walfridsson, Lund (SE)

(73) Assignee: Precise Biometrics AB, Lund (SE)

( * ) Notice: Subject to any disclaimer, the term of this patent is extended or adjusted under 35 U.S.C. 154(b) by 626 days.

(21) Appl. No.: 10/258,815

(22) PCT Filed: Feb. 6, 2001

(86) PCT No.: PCT/SE01/00210

§ 371 (c)(1),
(2), (4) Date: Jan. 10, 2003

(87) PCT Pub. No.: WO01/84494

PCT Pub. Date: Nov. 8, 2001

(65) Prior Publication Data

US 2004/0052405 A1    Mar. 18, 2004

Related U.S. Application Data (60) Provisional application No. 60/210,635, filed on Jun. 9, 2000.

(30) Foreign Application Priority Data

Apr. 28, 2000    (SE) .................................... 0001576

(51) Int. Cl.
 G06K 9/00    (2006.01)
 G06K 9/62    (2006.01)
 G06K 5/00    (2006.01)
 G05B 19/00    (2006.01)

(52) U.S. Cl. .................... 382/124; 382/209; 340/5.83; 235/382

(58) Field of Classification Search ................ 382/124, 382/209; 340/5.83; 235/382
See application file for complete search history.

(56) References Cited

U.S. PATENT DOCUMENTS

| 5,067,162 A | 11/1991 | Driscoll, Jr. et al. |
| 6,011,858 A | 1/2000 | Stock et al. |
| 6,125,192 A * | 9/2000 | Bjorn et al. ................ 382/124 |
| 6,799,275 B1 * | 9/2004 | Bjorn ........................ 713/186 |

FOREIGN PATENT DOCUMENTS

DE    196 48 767    6/1997

(Continued)

*Primary Examiner*—Joseph Mancuso
*Assistant Examiner*—Kathleen Yuan
(74) *Attorney, Agent, or Firm*—Buchanan Ingersoll & Rooney PC (57) ABSTRACT

A portable data carrier comprises a communication means and a memory with a biometric template which is intended to be compared with a biometric sample for identity check. The biometric template is divided into a private part which is adapted to be exclusively used in the portable data carrier and a public part which is adapted to be transferred, with the aid of the communication means, to an external processing unit and be used therein. Moreover, a processing unit for use in biometric identity check is described, comprising a processor and a communication means. The communication means is adapted to receive a biometric sample and a public part of a biometric template, the processor is adapted to compare the received public part of the template with the biometric sample, and the communication means is further adapted to transfer, when a comparison criterion has been satisfied, at least part of the biometric sample to the portable data carrier for further comparison on the data carrier. A method for recording a biometric template and performing a biometric identity check is also described.

37 Claims, 3 Drawing Sheets

FOREIGN PATENT DOCUMENTS

| | | |
|---|---|---|
| DE | 198 11 332 | 9/1999 |
| EP | 0 864 996 | 9/1998 |
| SE | 425 704 | 10/1982 |
| SE | 425704 | 10/1982 |
| SE | 512748 | 5/2000 |
| WO | WO99/51138 | 10/1999 |
| WO | WO 00/49944 | 8/2000 |
| WO | WO 00/55800 | 9/2000 |
| WO | WO 00/68873 | 11/2000 |
| WO | WO 00/70542 | 11/2000 |

* cited by examiner

BIOMETRIC IDENTITY CHECK

This is a 35 U.S.C. §371 filing of International Application No. PCT/SE01/00210, filed Feb. 6, 2001 that designates the United States of America and was published in English, and claims the benefit of filing under 35 U.S.C. §119(a) of Swedish Application No. 0001576-8, filed Apr. 28, 2000, and under 35 U.S.C. § 119(e) of U.S. Provisional Application No. 60/210,635, filed Jun. 9, 2000.

FIELD OF THE INVENTION

The present invention relates to a portable data carrier which comprises a memory with a biometric template which is intended to be compared with a biometric sample for identity check. The invention further relates to a processing unit, a computer program product and various methods which are intended for use in connection with biometric checking of identity.

BACKGROUND OF THE INVENTION

The access to information, to a room or the like must in many cases be restricted to certain individuals. This is the case, for instance, when electronic money transactions occur via the Internet, when in a hospital the access to case records is to be limited, or when only certain individuals in a place of work are allowed to have access to certain information or certain rooms.

To this end, use is often made of what is referred to as intelligent cards or smart cards. A smart card can be described as a card in the size of an account card which has a built-in processor, a memory and some kind of communication interface, which in its simplest form may consist of one or more metal contacts.

Also so-called hardware tokens work essentially according to the same principle as smart cards. They are typically used in a computer as a key to "unlock" the computer and give a user access to information. The difference compared with a smart card is more of a practical type since a hardware token can be directly inserted into the USB or serial port of a computer while a smart card must be placed in a special smart cart reader which is connected to or incorporated in the computer. For this reason, also the software on the hardware token differs somewhat from the software on smart cards, but their purpose is essentially the same.

On all smart cards that are used in the above contexts, sensitive information is stored in the memory. A first part of the sensitive information is reference information stored in advance about the user of the card. It is with this reference information that a comparison is made every time the card user wishes to verify his right to use the card.

Smart cards also contain a second part of sensitive information which consists of computer files which only the card user may access. They may contain, for example, computer files with private encryption keys, longer passwords or other information that can be used to identify the user. When the card user wants to verify that he has the right to access to the sensitive information stored in the computer files on the smart card, he places the card in a smart card reader and enters a pin code (PIN=Personal Identification Number). The pin code is limited to 16 bytes and usually consists of four digits between zero and nine which are matched with a reference pin code stored on the card. If the pin code corresponds with the reference, "the card is unlocked", i.e. the user gains access to the computer files containing the sensitive information. Pin codes are presently used in many situations, and many people find it difficult to remember a number of different pin codes. Therefore, many people choose to use the same pin code in a number of different situations, thus deteriorating security.

For this reason, and with a view to further increasing security, alternative solutions have been presented, in which a user instead identifies himself with the aid of biometric information. By biometric information is meant information which is body-related and individual-specific for the user. It may consist of, for instance, the pattern of the user's fingers, palm, iris, or some other information which is not related to appearance but yet individual-specific, such as the user's voice. A method in which a user identifies himself with the aid of his fingerprint typically proceeds as follows:

The user places his smart card in a smart card reader and one finger on a sensor which generates a digital image, i.e. a digital representation, of the fingerprint. The digital image of the fingerprint proceeds to an external processor, for instance a personal computer, where it is preprocessed. In the preprocessing, the amount of information in the image is reduced so that, for instance, a binarised image or parts of a binarised image are generated. A corresponding preprocessed image has been stored on the card as reference information. This reference information is usually referred to as a template. The external processor collects the template from the card and compares this with the preprocessed image of the finger. In case of correspondence, the external processor transmits a pin code to the card. This pin code acts as a key and gives access to the sensitive information stored in the memory of the card. If the template and the preprocessed image information do not correspond with each other, no pin code is transmitted and the user cannot access the computer files with the sensitive information on the card.

Even if biometry is used so that the user will not need to use a pin code, a pin code is still transmitted at the last stage of the verification process since this pin code is necessary for the "unlocking" of specific files containing sensitive information on the smart card. Thus the pin code must be hardcoded either in the software for the application which communicates with the card, or in some hardware in the unit where the card is read and written. Consequently no significant increase of the security is achieved despite the use of biometry since there is still a risk that someone may access the computer files with sensitive information on the card by transmitting the pin code to the card.

A further problem is that the template with which the matching occurs must be read from the card into the external processor in which the comparison with the user's biometric data takes place. In the first place this is a security risk, and in the second place there are directives issued by computer security authorities in certain countries which recommend that a biometric template should never leave the smart card.

One solution to the above problems is presented in Swedish Patent No. 8101707-1 which discloses an account card type data carrier which is provided with verification equipment comprising a sensor on which a user places one of his fingers. The sensor records papillary line information from the user's finger and calculates an identification bit sequence which is compared with a previously stored reference bit sequence. If the bit sequences conform with each other, an acceptance signal is generated, which can activate an indication means or a connecting means which makes the data carrier useable.

Although this solution eliminates the use of pin codes and lets the template remain on the card all the time, certain drawbacks still remain. For instance, the card cannot be a standard type smart card since such a card has no sensor and also does not have sufficient processor capacity to carry out the proposed method.

SUMMARY OF THE INVENTION

An object of the present invention therefore is to obviate, or at least alleviate, the above problems and to provide an alternative solution for biometric checking of identity, which solution has a high degree of security but yet allows use of e.g. a standard type smart card with limited processing capacity.

According to the invention, this object is achieved by a portable data carrier according to claim 1, a method for biometric checking of identity according to claim 15, a processing unit according to claim 22, a processing unit according to claim 24, a method for producing a biometric template according to claim 28, a method according to claim 35, and a method for biometric checking of identity according to claim 36.

More specifically, the invention concerns a portable data carrier, comprising a memory with a biometric template which is intended to be compared with a biometric sample for identity check. The biometric template is divided into a private part which is adapted to be exclusively used in the portable data carrier and a public part which is adapted to be transferred to an external processing unit and be used in the same.

By portable data carrier is meant a number of different portable units, such as smart cards, hardware tokens, MultiMedia Cards (MMC) etc, which all have the feature in common that they have a safe memory area which can be used for biometric checking of identity, i.e. for checking that a biometric template and a later recorded biometric sample originate from the same person.

By the expressions biometric template and biometric sample are meant data that is unique to an individual. Examples of such data can be the pattern of the person's fingers, palm, iris, or the person's voice. The template relates to reference information which is stored on the data carrier, whereas the sample relates to biometric data which must be presented by a person on each occasion of checking his or hers identity.

The fact that the template is divided into a private and a public part means that a certain part of the template never leaves the data carrier and that this part is thus not accessible to an unauthorised person, which results in significantly increased security compared with the case where the entire template is read from the data carrier and compared with a sample in an external unit.

The public part, however, is intended to be transferred to the external processing unit and to be used only in the same. This makes it possible to carry out some processor-demanding processing in the external processing unit so that less processing capacity in the data carrier is required, thus making it possible to use, for example, standard type smart cards.

Moreover a possibility of utilising different security levels for different applications is created since it is possible either to merely make a first comparison between the public part of the template and the biometric sample in the external processing unit or, in addition, to make a comparison in the data carrier between the private part of the template and the biometric sample.

This means that first a check of the biometric sample is made in the processing unit, and if this check satisfies a predetermined comparison criterion, one or more parts of the biometric sample are transferred to the data carrier for a final check in the same. By the final identity check being made on the data carrier, no pin code need be generated in the processing unit and transferred to the data carrier. Instead one or more parts of the biometric sample are transferred, which is much more difficult to fake since it is much more complex than a common pin code. Security also increases still more since it is impossible for an ill-intentioned person to steel or copy the entire template from the processing unit since only part thereof leaves the data carrier to be used in the first comparison in the processing unit.

According to a preferred embodiment, the private part of the biometric template comprises at least one partial area, which constitutes a private partial area, of a digital image of an individual-specific parameter. Preferably a plurality of private partial areas are used.

Thus the private partial area is a subset of a digital image. The use of a partial area of an image in a biometric template is advantageous since a suitably selected partial area contains much information which can be used in the identity check. One or more suitably selected partial areas, e.g. fingerprint partial areas with special line formations, may result in almost the same good security as if a complete image of the individual-specific parameter is used while at the same time the amount of information used in the comparison has been reduced to a considerable extent. It goes without saying that more partial areas result in greater security, but on the other hand greater processing capacity of the data carrier is necessary.

The digital image can be made by means of thermal technique, optical technique, capacitive technique or some other convenient technique. It may be processed after the actual recording, for instance binarised.

The individual-specific parameter can be, for example, the pattern of a person's iris or retina, a handprint of some other individual-specific parameter which can be reproduced. However, it is preferably a fingerprint. This enables a simple recording process where conventional sensors can be used and the individual can easily provide the biometric template.

In a preferred embodiment, the public part of the biometric template comprises information which is intended to be used for determining a reference point in the biometric sample, which reference point corresponds to a reference point in the biometric template.

As a result, it is possible to determine how the biometric sample is translated in relation to the biometric sample, which makes it possible to select areas of the biometric sample which correspond to the private partial area or areas.

In a preferred embodiment, the public part of the biometric template comprises information which is intended to be used for determining how the template is oriented in relation to the biometric sample.

It is an advantage to use the public part of the template for this purpose since, if one knows how the template is oriented in relation to the biometric sample, the comparison between the biometric sample and the private partial area in the data carrier requires less processor capacity as the comparison then need not take place for different turning positions. Moreover, a reference point is obtained for selecting the areas of the biometric sample that are to be sent to the data carrier for comparison with the private partial area or areas.

In a preferred embodiment, the public part of the biometric template comprises at least one partial area, which constitutes a public partial area, of the digital image of the individual-specific parameter.

In the same way as the private partial area, the public partial area thus is a subset of a digital image which represents, for instance, a fingerprint, the pattern of a person's iris or retina, a handprint or some other reproducible individual-specific parameter. The public partial area, which preferably is a single partial area in the centre of the fingerprint, makes it possible to determine the orientation of the template in relation to the sample as well as a reference point for selection of sample partial areas to be sent to the data carrier based on merely a comparison between the partial area and the sample in different relative positions. Such a match produces a reliable result.

In a preferred embodiment of the portable data carrier, the number of private partial areas is greater than the number of public partial areas in the template. As a result, only one or a few areas need be transferred from the data carrier to the external processing unit. The comparison with the biometric sample in the external processing unit will therefore be quicker and at the same time security increases still more since a large part of the template never leaves the data carrier.

For instance, there may be a single public partial area which is collected from the centre of a fingerprint and a plurality, for instance four to eight, private partial areas which are placed in predetermined positions at a distance from the public partial area.

In an alternative embodiment, at least one private partial area is located in immediate connection with a public partial area in the biometric template. This makes it easy to determine which partial areas of the biometric sample are to be transferred to the data carrier after the comparison of the public partial area or areas with the sample in the processing unit. Moreover, this partial area of the biometric sample will have been affected in the same manner (for example, the distance between the lines in a fingerprint varies with the force used by the individual when applying his finger to the sensor) as the partial area which was compared with the public part of the template, which results in quicker and safer identification.

As an alternative to a partial area, the public part of the biometric template may contain information about the mutual positioning of a plurality of features of a predetermined type in the digital image of the individual-specific parameter. These features can be, for example, line ends and line branches. The mutual positioning thereof can be used to determine the orientation of the template relative to the sample by matching the features in the public part of the template with the features in the sample. Preferably the public part of the template comprises at least five such features. The type of features may, but need not, be included in the public part of the template. Furthermore the features can be used to determine a reference point, which can correspond to, for example, a predetermined of the features.

The private partial area or areas of the template can be placed in the same fashion in relation to the public partial area for all templates. Alternatively, the private partial area or areas can be selected individually for each template so as to contain as much information of interest as possible. In the latter case, the public part of the biometric template further contains information about how the private partial area or areas are placed in relation to the reference point.

The information can then be used to select in the external processing unit which partial areas of the sample are to be sent to the data carrier for comparison with the private partial area or areas. The information can be available in the form of coordinates which are related to the reference point, for instance the centre in a public partial area.

In a preferred embodiment, the portable data carrier further comprises at least one threshold value which indicates to which extent the private partial area should correspond to a corresponding partial area of the biometric sample for these two partial areas to be considered to originate from the same individual. By the threshold value being stored in the data carrier, it may be set at different levels in different data carriers, so that the security requirements can be adjusted to different situations. The threshold value can even be set individual-specifically.

In a preferred embodiment the threshold value is stored in the private part of the template.

The portable data carrier suitably comprises a communication means via which the public part of the biometric template is adapted to be transferred to the external processing unit. The communication means can be intended for wireless communication, for instance inductive transmission or transmission by means of radio signals. However, it is currently preferred for the data carrier to have one or more contacts for galvanic contact with the external processing unit.

The portable data carrier further suitably comprises a signal processing means which is adapted to carry out a comparison between the private part of the template and at least part of the biometric sample. The signal processing means may comprise a suitably programmed processor or specifically adapted hardware, such as an ASIC (Application Specific Integrated Circuit) or an FPGA (Field Programmable Gate Array).

The portable data carrier is preferably a smart card. These cards can be of different standard types, such as Java or MULTOS cards, which are simple and inexpensive types of data carrier which can easily be adapted to different applications and which are easy for a user to carry. A standard type smart card which contains data about a certain user can thus be used in a plurality of situations since it is precisely standardised and since the operating system on the card handles the files in such manner that the handling of the files is independent of the application in which the card is used.

According to a second aspect, the invention relates to a method for biometric checking of identity in a processing unit. The method is characterised by the steps of receiving a biometric sample and a public part of a biometric template, which has a private part stored in a second unit and adapted to be used exclusively in the second unit, comparing the received public part of the template with the biometric sample and, when a comparison criterion has been satisfied, transferring at least part of the biometric sample to the second unit for further comparison with the private part of the biometric template.

The advantages of the method are evident from the discussion regarding the data carrier. The second unit can be a portable data carrier. It can also be a stationary unit, with which the processing unit communicates. The method is especially usable when the processing unit has poor security for carrying out the biometric checking of identity and when the second unit has limited processor capacity and/or when, for various reasons, it is desirable to limit the quantity of data to be transferred from the processing unit to the second unit.

The method can be implemented as a computer program which is executed by a processor in the processing unit. To this end, the invention concerns according to a third aspect a computer program product comprising program code which, during execution in a computer, carries out a method according to claims 15-22.

According to a fourth aspect, the present invention relates to a processing unit for use in biometric checking of identity, said processing unit comprising means for carrying out a method according to claims 15-22.

The means may comprise a processor with suitable software. It may alternatively comprise specially adapted hardware. The processing unit can be a suitably programmed general computer with means, for instance a card reader, which permit exchange of information with a second unit. It can also be a special card reader which has been provided with hardware and/or software which enables carrying out the above-described method direct in the card reader. The above means suitably also comprise a communication means for communication with the second unit.

The comparison criterion used in the processing unit to determine whether parts of the biometric sample are to be sent to the data carrier may vary between different applications, depending on which security level is desirable. The criterion can easily be entered in the processing unit by a person skilled in the art who is responsible for the current security system, or it can be stored in the software.

In a preferred embodiment, the processing unit further comprises a sensor for recording the biometric sample. That means that no extra equipment need be connected to the processing unit and the recording and the preprocessing, if any, can thus be integrated so that the procedure as from the recording of the user's biometric sample up to and including the transfer to the portable data carrier will be quick. Also security increases since the biometric sample need not be transferred between a special recording unit and the processing unit. Alternatively, the sensor can be located in a separate unit, from which the recorded biometric sample is transferred to the processing unit.

According to a fifth aspect, the invention relates to a method of producing a biometric template, comprising the steps of recording a biometric sample which represents an individual-specific parameter; selecting a first part of the biometric sample; selecting a second part of biometric sample; storing the selected first and second parts in a memory in a first unit in a public and a private part, respectively, of a biometric template, the private part being adapted to be used exclusively in the first unit and the public part being adapted to be used outside the first unit.

The first unit can be a portable data carrier, especially a smart card.

When producing the template, a recording of a biometric sample thus is made according to a prior-art method, in which the result is, for instance, a digital image of the current biometric sample. In this sample, a private and a public part are then selected. The selection of the first and the second part means that the quantity of data that need be stored in the data carrier decreases to a considerable extent, and the advantages arising in consequence of this have been discussed above. After the parts have been selected, they are transferred to the data carrier and stored permanently in the memory thereof.

According to a preferred embodiment of the above method, the selection of the first and the second part each comprises selection of at least one partial area of a digital image, each partial area being selected according to a predetermined public and, respectively, private selection criterion.

The selection criterion can vary according to how safe the identification is to be made. For example, the public and, respectively, the private partial areas can either be selected in the same way for all individuals, or be selected in a unique way to each individual, where the areas which are of greatest interest from the viewpoint of identification are selected. However, the public partial area or areas are advantageously selected in such manner that they will be easy to find in the comparison with the biometric sample. Consequently, a quick match can be carried out in the processing unit. The private partial areas, however, can be selected according to other criteria since their position in the biometric sample can be related to the position of the public partial area and a quick match can therefore still be achieved.

The method can be accomplished in specially adapted hardware or software or in a convenient combination thereof.

To that end, the invention concerns, according to a fifth aspect, a computer program product comprising program code which, during execution in a computer, carries out a method according to claims 28-34.

According to a sixth aspect, the invention also relates to a method for carrying out biometric checking of identity, comprising the steps of recording a biometric sample which represents an individual-specific parameter; comparing in a first unit a public part of a biometric template, which public part has been received from a second unit, with the biometric sample to find out whether a first predetermined comparison criterion has been satisfied; selecting, if the first comparison criterion has been satisfied, at least part of the biometric sample according to a predetermined selection criterion and transferring said at least part to a second unit; comparing in the second unit said at least part of the biometric sample with a private part, stored in the second unit, of the biometric template to find out whether a second predetermined comparison criterion has been satisfied.

The advantages of this method will be evident from the discussion above. The first predetermined comparison criterion can be a predetermined degree of correspondence between the public part and the biometric sample, for instance a certain number of matching features or a certain number of matching pixels in two overlapping partial areas. The second comparison criterion can be a predetermined degree of correspondence between the private part of the template and part of the biometric sample. This comparison criterion can advantageously be stored in the second unit, and preferably in the private part of the template so as not to be accessible from outside.

The method can be accomplished in specially adapted hardware, in software or in a suitable combination thereof. To this end, the invention relates according to a seventh aspect to computer software comprising program code which, during execution in a computer, carries out a method according to claims 36-37.

According to an eighth aspect, the present invention relates to use of a biometric template which is divided into a private part adapted to be exclusively used in a unit in which the template is stored, and a public part adapted to be transferred to and used in an external processing unit.

As an example of use, storing in electronic form of such a template can be mentioned.

BRIEF DESCRIPTION OF THE DRAWINGS

The invention will now be described in more detail by way of an embodiment with reference to the accompanying schematic drawings.

DESCRIPTION OF PREFERRED EMBODIMENTS

Figure 1:
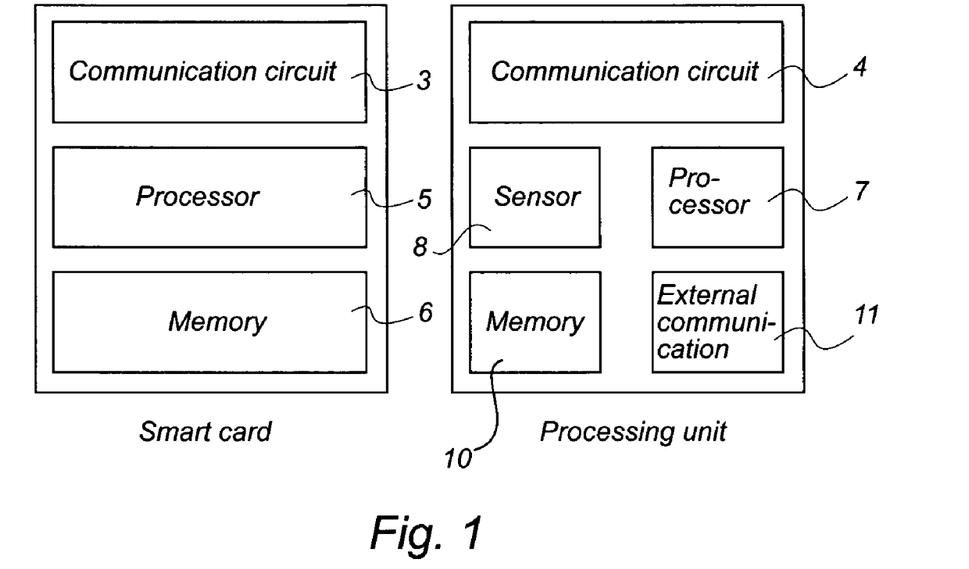
FIG. 1 is a schematic drawing illustrating a portable data carrier and a processing unit according to the invention.

FIG. 1 is a schematic view of a system according to the invention, which consists of a portable data carrier 1 in the form of a smart card and a processing unit 2. The system is intended to be used for biometric identity check based on fingerprints.

The smart card 1 is an ordinary standard type card, for instance a Java or MULTOS card, and has a communication means 3 which is adapted to communicate with the processing unit 2. The communication means 3 may comprise one or more metal contacts which make it possible for the processing unit to read information on the smart card. The communication means 3 can alternatively comprise circuits which enable wireless communication between the smart card and the processing unit, e.g. circuits for inductive transmission of information or for radio communication. The smart card 1 further has a processor 5 and a memory 6. The memory 6 contains sensitive information on the one hand in the form of computer files to which the person using the system wishes to gain access and, on the other hand, in the form of a biometric template which has a private part that never leaves the smart card and a public part that is allowed to leave the smart card. In addition to the sensitive information and the template, the memory 6 also comprises software which the processor 5 uses, for example, to compare the template with a biometric sample.

The processing unit 2 can be a device which is specially designed to carry out biometric identity check or a standard type computer which has been provided with suitable software and a card reader which can read the information on the smart card 1. The computer comprises a processor 7, which is used in the preprocessing of the user's biometric sample and in the comparison between this and the public part of the template. The processing unit further comprises a sensor 8 for recording a fingerprint. The sensor can be integrated with the processing unit or be connected thereto as a separate unit. The sensor is preferably of a capacitive type but it can also be, for instance, optical, thermal or pressure-sensitive. The sensor 8 is connected to the processor 7. The processing unit 2 further comprises a communication means 4 which makes it possible for the processing unit to read information on the smart card 1. The communication means may comprise one or more metal contacts which produce galvanic contact with one or more metal contacts on the smart card or circuits for inductive transmission of information or for transmission by means of radio signals. The processing unit 2 also comprises a memory 10 in which software is stored for the preprocessing of the biometric sample which the processor 7 carries out. The memory 10 also comprises software which, for example, controls how the comparison between the preprocessed biometric sample and the public part of the biometric sample is to be carried out, which comparison criteria are to be used, and which part or parts of the biometric sample are to be transferred from the computer 2 to the smart card 1. The processing unit 2 also has circuits 11 for external communication with other units, such as additional sensors or information-carrying units. The communication between the different units in the computer 2 and on the smart card 1, respectively, occurs via a data bus (not shown).

Figure 2:
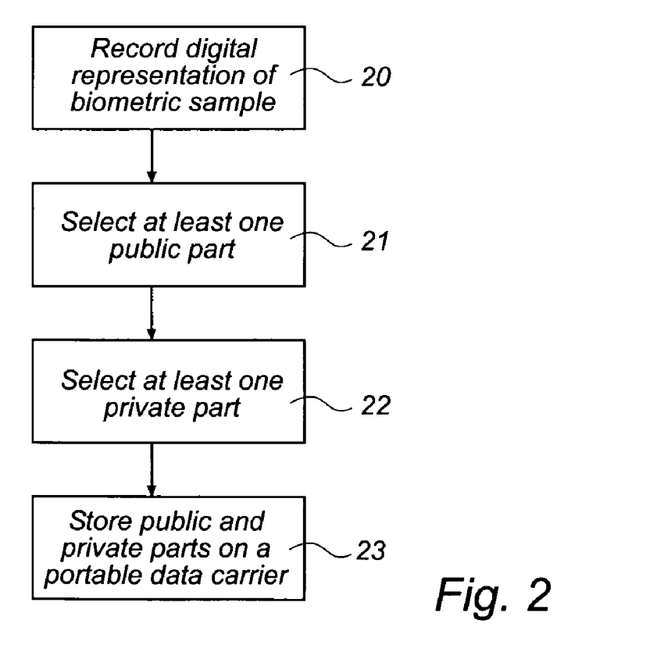
FIG. 2 is a block diagram illustrating a method according to the invention of producing a biometric template with a private and a public part and storing this in a portable data carrier.

FIG. 2 is a block diagram of a method of producing a biometric template with a private and a public part. It is here assumed that the method is carried out by means of a system according to FIG. 1. First, in step 20, a digital image in grey scale of the user's fingerprint is recorded by means of the sensor 8. This image thus constitutes a digital representation of the fingerprint. The recorded image is checked so that it is ensured, for instance, that there is really a fingerprint in the image, that the fingerprint takes up a sufficiently large part of the image and that the fingerprint is sufficiently clear.

It is checked, among other things, whether the user has applied his finger with sufficient pressure on the sensor 8 and so that any moisture on the user's finger has not made it impossible for the sensor 8 to distinguish between "ridges" and "valleys" on the finger. If necessary, the step of recording is repeated.

When a digital image in grey scale of sufficient quality has been recorded by the sensor 8, a binarisation of the image occurs. The binarisation implies that the pixels of the image are compared with a grey scale threshold value. The pixels which have a value smaller than the grey scale threshold value are converted to white and those having a value greater than the grey scale threshold value are converted to black. The grey scale threshold value can be the same for the entire image or vary between different parts of the image. The binarisation algorithm can also be refined, so that the pixels are compared with the surroundings, so as to prevent, for example, individual pixels from being white if all the surrounding pixels are black. Additional preprocessing of the image can also be carried out, such as change of resolution and contrast improvement.

After binarisation, a partial area, below referred to as public partial area, of the image is selected in step 21 to be stored in a public part of a template. The area can be selected in different ways. One way is to use the following three quality criteria: 1) Distinctness, i.e. how easy a partial area is to binarise, 2) Uniqueness, i.e. how unique a partial area is, and 3) Geographic location, i.e. where a partial area is located in the fingerprint.

For instance the uniqueness can be checked by correlating the partial area with the surroundings and selecting a partial area with a small degree of correlation with the surroundings. Alternatively, it is possible to search out partial areas with features, i.e. points where a fingerprint line branches off or ends.

As regards the geographic location, partial areas in the centre of the image are preferred since then there is a minimum risk that the partial areas are not included in a later recorded sample. Moreover, the image of the fingerprint will be least deformed in the centre when the user applies his finger with different pressures on the sensor.

The partial area which best corresponds to the above quality criteria is selected to constitute the public partial area. Preferably, a single public partial area in the centre of the image is selected so that as little information as possible about the user's fingerprint is available in the public part of the template. However, a plurality of public partial areas can be selected to achieve safer matching of the public part of the template with the biometric sample and thus obtain safer orientation of the template in relation to the sample.

When the public partial area has been selected, at least one, but preferably a plurality of partial areas, below referred to as private partial areas, are selected, in step 22, for storage in a private part of the template on the smart card 1. The private partial areas are preferably selected according to the same quality criteria as the public partial area or areas. Preferably, six private partial areas are selected. More or fewer partial areas can be selected according to the desired security level, the desired quickness in matching and the available processor capacity on the smart card.

Figure 4A:
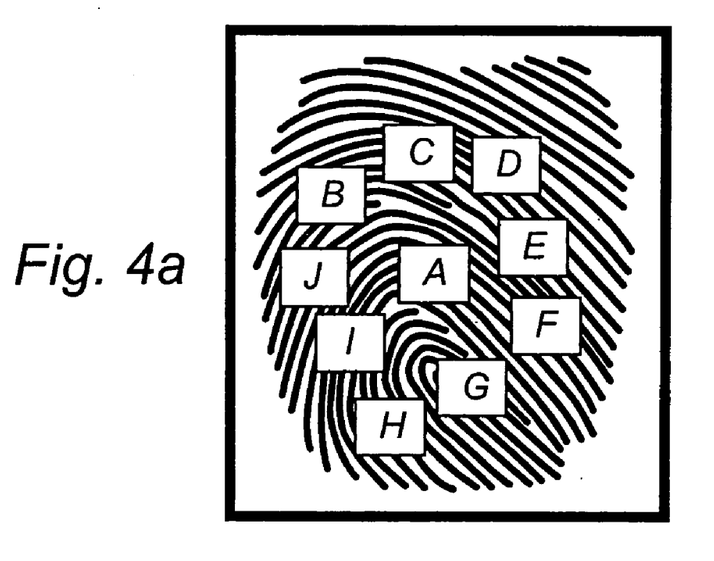
FIGS. 4a and b show two different positionings of private and public partial areas of a biometric sample for storage in the form of a template in a portable data carrier.
Figure 4B:
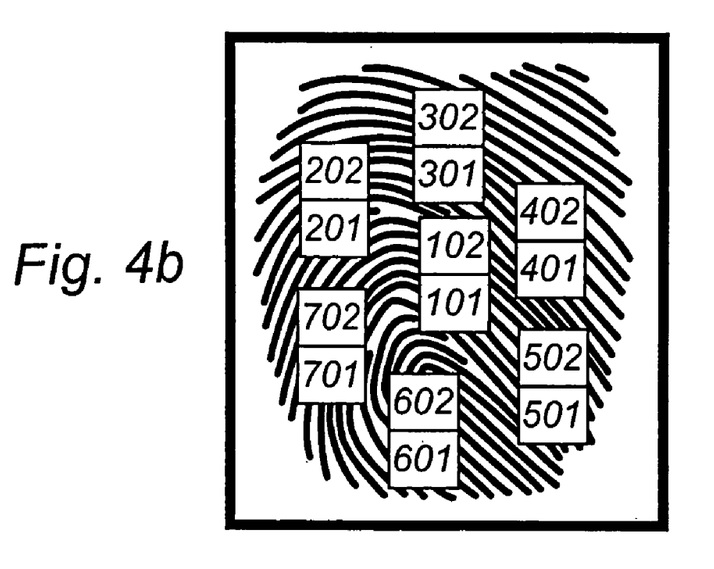

FIGS. 4a and 4b show examples of how public and private partial areas can be located in an image of a fingerprint. In FIG. 4a, there is a single public partial area A located in the centre and nine private partial areas B-J. In FIG. 4b there are seven public partial areas 101, 201, 301, . . . , 701 and the same number of private partial areas 102, 202, 302, . . . , 702. In this case, the private partial areas are selected so as to be positioned in immediate connection with the respective public partial areas.

The size of the selected public and private partial areas is in this embodiment 48×48 pixels, but can easily be adjusted by a person skilled in the art according to the current requirements.

In connection with the selecting of the private partial areas, also their location in relation to a reference point is determined. The reference point can be selected, for instance, to be the centre in the public partial area or in one of these if there are more. Other well-defined reference points, for instance by means of features, can of course also be selected. The locations of the private partial areas are indicated as coordinates in relation to the reference point. The coordinates are stored as part of the public part of the template.

Before the template is transferred to the smart card 1, a test matching is made with an additional image of the user's fingerprint made by means of the sensor 8. The test matching is carried out according to the method that will be described below with reference to FIG. 3. If the additional image and the template match each other, the template is considered to be recordable.

In step 23, the public and the private part of the template are then transferred from the processing unit 2 via the communication circuits 3, 4 to the memory 6 of the smart card 1. The public part of the template will thus contain the public partial area or areas as well as coordinates for the location of the private partial areas in relation to a reference point. Its private part will contain the private partial areas. In the private part, it is also possible to store comparison criteria in the form of threshold values for which degree of matching is to be achieved, when matching of the private partial areas with sample partial areas, for the template and the sample to be considered to originate from the same individual. For example, the threshold values may comprise a first threshold value which indicates to what extent an individual private partial area is to match a corresponding partial area in the biometric sample. This first threshold value may apply to all the private partial areas. The threshold values may further comprise a second threshold value which indicates how many of the private partial areas must satisfy the first threshold value. They may also comprise a third threshold value for the extent to which the private partial areas are to match the corresponding sample partial areas. The threshold values may, but need not, apply to the public partial area.

The partial areas are preferably stored in the form of compressed bit maps.

When the template has been transferred, additional sensitive information can, if desired, be transferred from the computer 2 and stored in the memory 6 of the smart card 1. The recording of a template for the card holder is usually made only once. The other sensitive information, however, can be exchanged when necessary.

Figure 3:
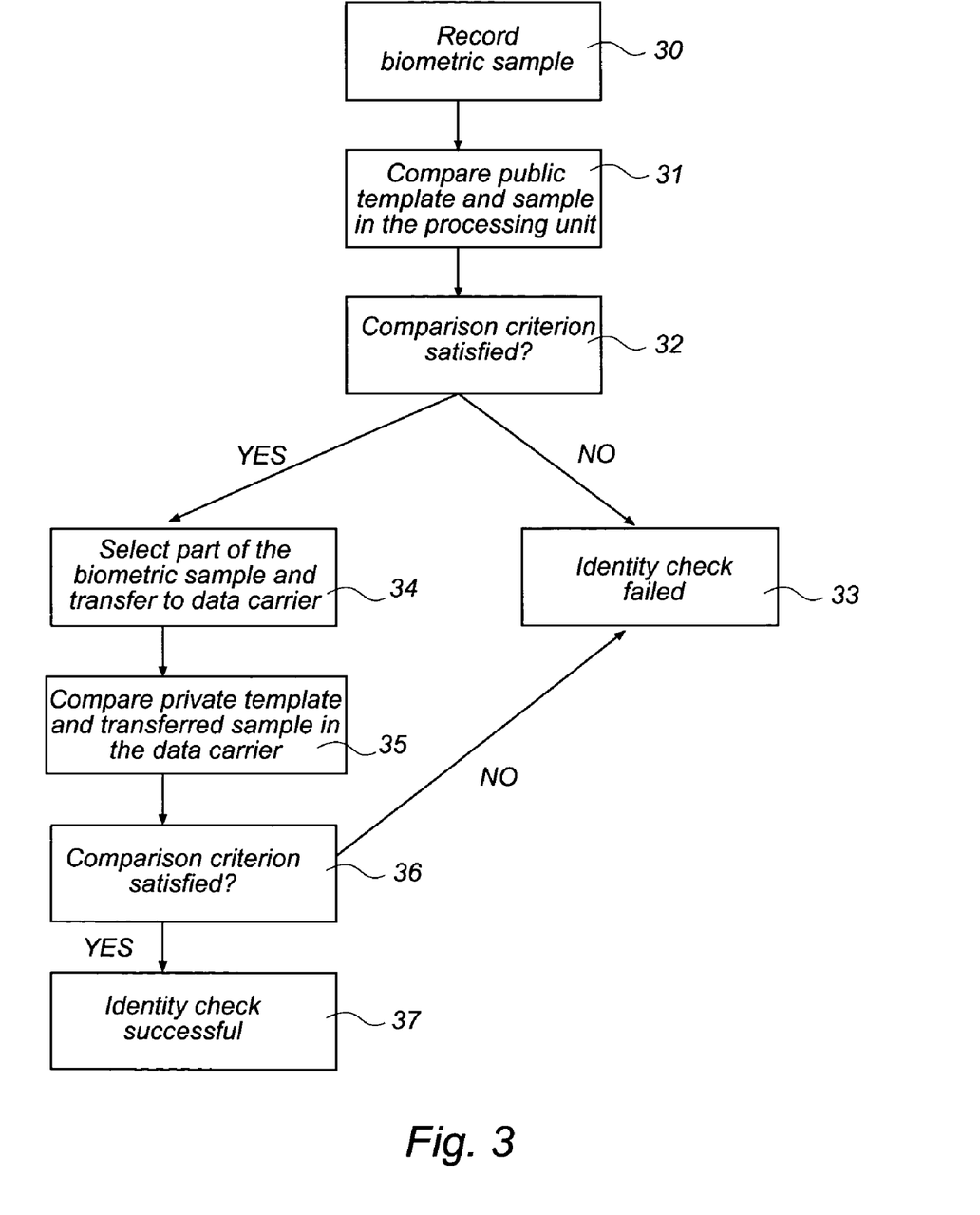
FIG. 3 is a block diagram illustrating a method according to the invention of performing a biometric identity check.

FIG. 3 shows a method for carrying out biometric identity check by means of a system according to FIG. 1 which comprises a smart card 1, in whose memory a template with a private and a public part is stored, as well as processing unit 2.

A person whose identity is to be checked first places his smart card 1 in a card reader which is integrated with or connected to the processing unit 2. He then places his finger on the sensor 8 and a digital image in grey scale is recorded in step 30 in the same way as described above. The image, which is a digital representation of the person's fingerprint, can be referred to as a biometric sample or a fingerprint sample. The quality of the image is checked preferably in the same way as in the recording of the template and is binarised. Subsequently the processing unit 2 reads the public part of the template on the smart card 1 via the communication circuits 3, 4.

In step 31, the public partial area included in the public part of the template is matched or compared with the binarised biometric sample. The matching can also be carried out with the entire sample or preferably with a part of a predetermined size, for instance 100×100 pixels, in the centre of the sample. In the matching, the public partial area "sweeps" over the sample image and in every position a comparison is carried out pixel by pixel. If a pixel in the template corresponds with a pixel in the sample image, a given value, for example 1, is added to a sum. If the pixels do not correspond, the sum is not increased. When the public partial area of the template has been swept over the entire sample image, a position is obtained where the public partial area of the template best overlaps the sample image. The public partial area can also be rotated in relation to the sample image to find out whether a better matching can be obtained.

When the translation and the rotation have been made and the best matching position for the sample fingerprint and the public partial area of the template has been found, the obtained matching value is compared in step 32 with a predetermined first comparison criterion, which in this case is a reference sum. If the matching value is smaller than the reference sum, the identity check is considered to have failed, step 33, but if the matching value is equal to or greater than the reference sum, the process proceeds in step 34.

By the matching of the public partial area of the template with the sample image, it has now been established how the template and the sample image are oriented in relation to each other. Thus, the point in the sample image which corresponds to the reference point in the template can be established. Then the coordinates in the public part of the template are used to determine which parts of the sample image are to be sent to the smart card to be compared with the private partial areas. More specifically, in step 34 a partial area of a predetermined size is selected round each point which is defined by the coordinates in the public part of the template. However, the sample partial areas should be slightly greater than the corresponding private partial areas in the template to compensate for any deformation of the fingerprint if the user's finger has been applied with a different pressure on the sensor when recording the sample image. These sample partial areas are then transferred to the smart card.

The areas can be transmitted in a predetermined sequence so that the processor on the smart card knows which area is which. As a further alternative, coordinates for the positioning of the sample partial areas can be transmitted as well.

In step 35, the processor 5 on the smart card 1 compares the transmitted sample partial areas with the private partial areas in the private part of the template. This matching is much less time-consuming than if the private partial areas, for example, should be matched with the entire sample image since the private partial areas need now only be matched in a limited number of positions with corresponding sample partial areas. If the position of rotation has been established in the processing unit, no rotations need be made. For instance, the matching can be made in the manner described above where a number of points is calculated on the basis of pixel identity. When the transferred sample partial areas have been compared with the private partial areas of the template, a total matching value between 0% (i.e. no match at all) and 100% (i.e. complete match) is obtained. This matching value is compared with a second comparison criterion in the form of a predetermined threshold value, step 36, which can be stored in the private part of the template. If the matching value is equal to or greater than the threshold value, the identity check is considered successful, step 37, and the user gains access to the sensitive information stored on the card. If the matching value is lower than the threshold value, the identity check is considered to have failed, step 33, and the user is refused access to the sensitive information. Alternatively, first the matching value of each individual partial area can be compared with a threshold value and the number of matching partial areas can be determined.

A more comprehensive description of how partial areas in a fingerprint can be selected and how a template area can be compared with a biometric sample area is to be found in Applicant's International Patent Application No. PCT/SE99/00553.

Although a special embodiment of the invention has been described above, it is obvious to those skilled in the art that many alternatives, modifications and variations are feasible in the light of the above description.

For example, it is possible to use more than one partial area in the public part of the template. The advantage of this is that a safer initial identity check and a safer determination of how the template is oriented in relation to the sample image are achieved. A further advantage is that if a user has injured his finger so that the first partial area does not match, a second public partial area can possibly match. Moreover the possibilities of orienting a template in relation to a sample image increase if sample image is displaced in relation to the template.

In the example above, the public part of the template comprises a partial area of the reference fingerprint image which is recorded when the template is produced. An alternative can be to let the public part comprise a description of the mutual positioning and, possibly, the kind of a plurality of features of a predetermined type. These features are transferred in the same way as the public partial area and matched with features in the sample image to establish the orientation of the template in relation to the sample image and, based on this orientation, a reference point which may consist of a predetermined of said features and on the basis of which the sample partial areas to be transferred to the smart card can be determined.

The public part of the template may also comprise other information which makes it possible to determine a reference point in the sample image, for instance a specification of a reference point on the basis of a relationship between line transitions or the like.

It would also be possible to let the public part of the template contain merely information, for instance coordinates, which indicates the positioning of the private partial areas in relation to a reference point and to let the reference point be a predetermined point in the actual fingerprint, i.e. not in the image, which point can be identified in a safe manner. PCT/SE99/00553 discloses different methods of searching out a reference point in a fingerprint.

In the example above, it is described that the private partial areas are selected according to certain quality criteria. It is, of course, possible to select these areas according to other criteria. It may be a variant to always select the areas in a predetermined position in relation to the reference point. In such a case, the public part of the template need not contain coordinates for the positioning of the private areas.

In the example above, the template is stored in a portable data carrier. It could also be advantageous to use the described method in communication between a processing unit and a stationary data carrier, such as a stationary computer. Such an example could be the use of biometric information to verify a user's identity when he wants to connect to, for instance, a bank on the Internet. The biometric template can then be stored in a stationary data carrier at the bank, while the user has a fingerprint sensor and software to carry out that part of the above method that is carried out in the processing unit. The advantage of using the method in this application, where the calculating capacity of the bank does not need to constitute a problem, would be that a significantly smaller amount of information need be transmitted from the user to the bank in the verification of the user's identity.

For instance, the areas of the image that are selected for the matching can be selected based on criteria completely different from those described above. Completely different types of biometric data can also be used, such as the user's voice and a digital representation thereof in the form of a frequency spectrum, or the user's iris. Therefore the invention is considered to comprise all such alternatives, modifications and variations that are within the scope of the appended claims.

Finally, it should be pointed out that the above described comparison of a public partial area with the biometric sample can be carried out in many other ways than the calculation of number of points as described above. For example, it is possible to use multiplication of pixels matching each other and subsequent integration in order to obtain a correlation or logic XOR (exclusive Or) for corresponding pixels and subsequent summing up. The matching can also be made on non-binarised images.

What I claim and desire to secure by Letters Patent is:

1. A portable data carrier, comprising:
   a memory with a biometric template which is intended to be compared with a biometric sample for identity check,
   wherein the biometric template is divided into a) a private part which is adapted to be exclusively used in the portable data carrier, wherein said exclusive use includes comparison of at least a part of said biometric sample with said private part and b) a public part which is adapted to be transferred to and used in an external processing unit, and
   wherein the public part of the biometric template comprises at least one partial area, which constitutes a public partial area, of a digital image of an individual-specific parameter, and the public and private parts are non-overlapping areas in the digital image.

2. A portable data carrier as claimed in claim 1, wherein the private part of the biometric template comprises at least one partial area, which constitutes a private partial area, of the digital image of the individual-specific parameter.

3. A portable data carrier as claimed in claim 1, wherein the individual-specific parameter is a fingerprint.

4. A portable data carrier as claimed in claim 1, wherein the public part of the biometric template comprises information which is intended to be used for determining a reference point in the biometric sample, which reference point corresponds to a reference point in the biometric template.

5. A portable data carrier as claimed in claim 1, wherein the public part of the biometric template comprises information which is intended to be used for determining how the template is oriented in relation to the biometric sample.

6. A portable data carrier as claimed in claim 2, wherein the number of private partial areas is greater than the number of public partial areas.

7. A portable data carrier as claimed in claim 2, wherein at least one private partial area is located in immediate connection with a public partial area in the digital representation.

8. A portable data carrier as claimed in claim 2, wherein the public part of the biometric template further comprises information about how said at least one private partial area is located in relation to a reference point.

9. A portable data carrier as claimed in claim 2, wherein the private part of the template comprises at least one threshold value which indicates to what extent said at least one private partial area is to match a corresponding partial area of the biometric sample for these two partial areas to be considered to originate from the same individual.

10. A portable data carrier as claimed in claim 1, further comprising a communication means, via which the public part of the biometric template is adapted to be transferred to the external processing unit.

11. A portable data carrier as claimed in claim 1, further comprising a signal processing means which is adapted to carry out a comparison between the private part of the template and at least part of the biometric sample.

12. A portable data carrier as claimed in claim 1, wherein the portable data carrier is a smart card.

13. A method for biometric identity check in a processing unit, comprising the steps of:
receiving a biometric sample and a public part of a biometric template, the biometric template further has a private part that is stored in a second unit and that is adapted to be exclusively used in the second unit, said public part of the biometric template comprising at least one partial area in a first digital image of an individual-specific parameter, the public and private parts are non-overlapping areas in the first digital image;
comparing the received public part of the template with the biometric sample; and
transferring, when a comparison criterion has been satisfied, at least part of the biometric sample to the second unit for further comparison in said second unit with the private part of the biometric template.

14. A method as claimed in claim 13, wherein said at least part of the biometric sample comprises at least one partial area in a second digital image of an individual-specific parameter.

15. A method as claimed in claim 13, wherein the private part of the biometric template comprises at least one partial area in the first digital image of the individual-specific parameter.

16. A method as claimed in claim 13, further comprising using the result of the comparison in order to determine which at least part of the biometric sample is to be transferred to the portable data carrier.

17. A method as claimed in claim 13, further comprising determining a reference point in the biometric sample by means of the public part of the template.

18. A method as claimed in claim 17, wherein the received public part of the biometric template comprises information about how said at least part of the biometric sample that is transmitted to the second unit is to be located in relation to the reference point, and further comprising using this information to determine which at least part of the biometric sample is to be transferred to the second unit.

19. A method as claimed in claim 13, wherein the biometric sample is a fingerprint.

20. A method as claimed in claim 13, wherein the second unit is a smart card.

21. A computer program product stored on a computer readable medium comprising program code which, during execution in a computer, carries out a method according to claim 13.

22. A processing unit for use in biometric identity check, comprising:
means for receiving a biometric sample and a public part of a biometric template, the biometric template further has a private part that is stored in a second unit and that is adapted to be exclusively used in the second unit, wherein the exclusive use includes comparison of at least a part of said biometric sample with said private part, said public part of the biometric template comprising at least one partial area in a first digital image of an individual-specific parameter, the private and public parts are non-overlapping areas in the first digital image;
means for comparing the received public part of the template with the biometric sample; and
means for transferring, when a comparison criterion has been satisfied, at least part of the biometric sample to the second unit for further comparison within the second unit with the private part of the biometric template.

23. A processing unit as claimed in claim 22, wherein said means for receiving comprise a processor and a communication means.

24. A processing unit as claimed in claim 22, further comprising a sensor for recording the biometric sample.

25. A method for producing a biometric template, comprising the steps of:
recording a biometric sample in the form of a digital image of an individual-specific parameter;
selecting a first part in the biometric sample, said first part comprising at least one partial area, which constitutes a public partial area, of the digital image;
selecting a second part in the biometric sample which does not overlap the partial area of the first part; and
storing the selected first and second part in a memory in a first unit in a public part and a private part, respectively, of a biometric template, the private part being adapted to be exclusively used in the first unit, wherein the exclusive use includes comparison of at least a part of said biometric sample with said private part, and the public part being adapted to be used outside the first unit.

26. A method as claimed in claim 25, wherein selecting a second part comprises selecting at least one partial area, which constitutes a private partial area, in the digital image.

27. A method as claimed in claim 26, further comprising determining the positioning of the private partial area in relation to a reference point which is defined by the public part of the template, and storing information about the positioning in the public part of the template.

28. A method as claimed in claim 26, further comprising storing in the first unit a threshold value which indicates to what extent said at least one private partial area is to match a corresponding partial area of the biometric sample for these two partial areas to be considered to originate from the same individual.

29. A method as claimed in claim 25, wherein the digital image is a fingerprint.

30. A method as claimed in claim 25, wherein the first unit is a smart card.

31. A computer program product stored on a computer readable medium that comprises program code which, during execution in a computer, carries out the method according to claim 25.

32. A method for carrying out biometric identity check, comprising the steps of:
recording a biometric sample which represents an individual-specific parameter;
comparing in a first unit a public part of a biometric template, which public part has been received from a second unit and which public part comprises at least one partial area of a first digital image of an individual-specific parameter, with the biometric sample in order to find out whether a first predetermined comparison criterion has been satisfied;
selecting, if the first comparison criterion has been satisfied, at least part of the biometric sample according to a predetermined private selection criterion and transferring said at least part of the biometric sample to the second unit;
comparing, in the second unit, said at least part of the biometric sample with a private part, stored and adapted to be exclusively used in the second unit, of the biometric template to find out whether a second predetermined comparison criterion has been satisfied, wherein the public and private parts are non-overlapping areas in the first digital image.

33. A method as claimed in claim 32, wherein the biometric sample is recorded as a second digital image of the individual-specific parameter.

34. A method as claimed in claim 32, wherein said at least part of the biometric sample comprises at least one partial area of a second digital image of the individual-specific parameter.

35. A method as claimed in claim 32, wherein the private part of the biometric template comprises at least one partial area of the first digital image of the individual-specific parameter.

36. A method as claimed in claim 32, wherein the second unit is a smart card.

37. A computer program product stored on a computer-readable medium comprising program code which, during execution in a computer, carries out the method according to claim 32.

* * * * *